Dec. 4, 1956   J. A. BARTHEL   2,773,170
ATTACHMENT FOR WELDING MACHINES
Filed Nov. 19, 1953
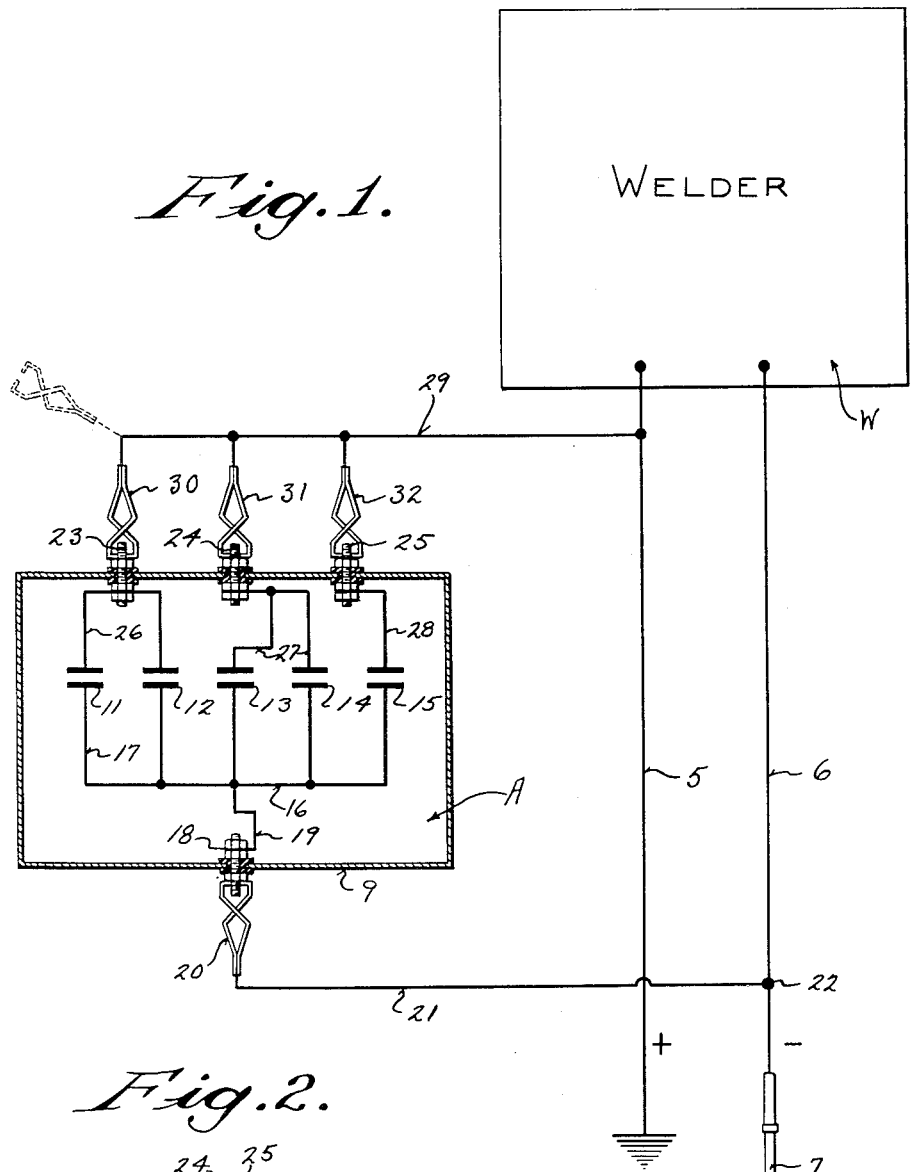
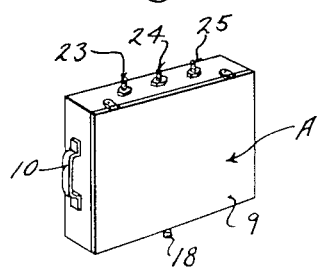
INVENTOR
JULIUS A. BARTHEL
BY
ATTORNEYS

United States Patent Office 2,773,170
Patented Dec. 4, 1956

2,773,170

ATTACHMENT FOR WELDING MACHINES

Julius A. Barthel, Milwaukee, Wis.

Application November 19, 1953, Serial No. 393,159

1 Claim. (Cl. 219—131)

This invention appertains to an attachment for an electric welding machine of the type employing an electric discharge through a gap or arc maintained between a weld rod or electrode and the work for uniting metal together.

Electric welding machines of straight polarity or direct current arc are extensively used in industry, but these machines are open to serious objections, particularly when used on fine work, overhead or vertical work, and where a weld rod of small diameter has to be employed, in that, the arc is subject to instabilities causing uneven flow of the metal, sputtering, etc.

One of the primary objects of my invention is to provide means capable of use with electric welding machines now on the market and for direct connection with the positive and negative wires leading from the machine to the ground or work and to the weld rod which will effectively eliminate pulsations in the electric current and result in a stable arc of a desired fixed intensity, whereby the metal will flow smoothly and not in spurts and which will permit the effective use of small weld rods; the even flow of the metal resulting in the ease of welding on vertical and overhead work.

Another salient object of my invention is to provide an attachment for electric welding machines embodying a plurality of capacitors or condensers of a certain capacity with means for connecting all or certain of the capacitors or condensers across the leads from the welding machine, the capacitors functioning to stabilize the arc or gap and thus bring about long desired welding results.

A further important object of my invention is the provision of novel means, in the nature of an attachment for an electric welding machine for stabilizing the arc whereby to permit an even flow of the metal and so that the metal will have the desired affinity to make a smooth joint.

With these and other objects in view, the invention consists in the novel construction, arrangement and formation of parts as will be hereinafter described and claimed and illustrated in the accompanying drawing, in which drawing, Figure 1 is a diagrammatic view showing my attachment in use and connected across the leads of the welding machine and with all of the capacitors of the attachment arranged in parallel and in service, and Figure 2 is a perspective view of the attachment disconnected from the leads of the welding machine.

Referring to the drawing in detail, wherein similar reference characters designate corresponding parts throughout the several views, the letter A generally indicates my novel attachment for an electric welding machine W which can be considered as being of any well known type now in use in industry.

The electric welding machine will not be described in detail, but the same includes the positive and negative lead wires 5 and 6 leading from the D. C. welder of straight polarity and the lead 5 can be grounded to the work and the lead 6 is connected to the holder 7 for the weld rod 8.

My attachment A preferably includes a casing or housing 9 of a small compact form so that the same can be readily carried from place to place and the same can be provided with a carrying handle 10. Suitably mounted within the case 9 is a plurality of capacitors or condensers 11, 12, 13, 14 and 15. Each of these capacitors or condensers is of a well known type which can be bought in the open market and each is of a 300 microfarad capacity. The negative terminals of all of the condensers or capacitors are connected to a common conductor 16 by branch lead wires 17 and the common conductor 16 is electrically connected to a terminal 18 by a lead wire 19. This terminal 18 extends out of the case 9 so that a clamp 20 electrically connected to a wire 21 can be readily attached to or detached from the said terminal 18. This wire 21 is electrically connected, as at 22, with the negative wire 6 leading from the welding machine W.

The case 9 also has connected thereto terminal posts 23, 24 and 25 which extend exteriorly of a wall of the case for a purpose, which will later appear. As previously brought out, in certain instances all of the capacitors 11, 12, 13, 14 and 15 are connected across the leads 5 and 6 of the welding machine and in other instances, only selected capacitors are used across the leads depending on the character of the work being welded, the type of welding rod, etc. To bring about the desired selection of capacitors, the plus terminals of the capacitors 11 and 12 are connected by wires 26, with the binding post 23. The plus terminals of the capacitors 13 and 14 are connected by wires 27 with the binding post 24 and the plus terminal of the capacitor 15 is connected by a wire 28 with the binding post 25.

Electrically connected to the positive lead wire 5 is a conductor 29 and electrically connected to the conductor 29 are terminal clamps 30, 31 and 32.

When it is desired to use all of the capacitors across the leads 5 and 6, the clamps 30, 31 and 32 are electrically connected with the terminal posts 23, 24 and 25, as shown in full lines of Figure 1 of the drawing. Ovbiously, by disconnecting one or more of the clamps, certain capacitors can be eliminated.

Considering that all of the capacitors are connected across the leads 5 and 6 by the clamps 30, 31 and 32, the capacitors function to prevent fluctuations of the current and to stabilize the arc. This effectively permits the smooth flow of metal without sputtering, permitting a smooth joint without pits, and as the metal does not flow in spurts, successful welding on vertical and overhead surfaces can be made without danger to the welder. Due to the stable arc and even flow of the metal, the metal appears to have greater affinity and a strong joint is made. Also due to the stable arc with the even flow of metal, a small weld rod on a large size electric welding machine can also be successfully used.

While the attachment is particularly useful on D. C. electric welding machines of straight polarity, the same can be used for reverse polarity and in which case the single capacitor 15 is utilized, and the wire 6 is grounded and the wire 5 is connected to the weld rod holder 7.

While I have shown in the drawing, five capacitors, of a certain capacity, it is to be understood that I do not limit myself to this exact number or to any definite capacity of capacitors.

I lay great stress on the fact that I make no change in the electric welding machine (D. C.) itself, and that my device is in the nature of a portable attachment which can be quickly and easily connected to the leads of an electric welding machine for the ground and weld rod.

Changes in details may be made without departing from the spirit or the scope of this invention, but what I claim as new is:

An attachment for an electric welding machine to stabilize the welding arc comprising a case, a plurality of capacitors of a predetermined definite capacity disposed in said case, a negative binding post carried by said case and extending outwardly therefrom, means electrically connecting the negative terminals of all of the capacitors to the binding post, a plurality of positive terminals carried by the case and extending outwardly therefrom, means electrically connecting certain capacitors to certain terminals, positive and negative conductor wires for connection with the positive and negative leads of the welding machine, a clamp for the conductor for the negative lead detachably engaging the negative binding post, and a plurality of clamps electrically connected with the conductor wire for the positive lead for selective engagement with the terminals for bringing one or more capacitors into use.

References Cited in the file of this patent

UNITED STATES PATENTS

| | | |
|---|---|---|
| 1,597,291 | Rosemond | Aug. 24, 1926 |
| 2,295,293 | Rogers | Sept. 8, 1942 |
| 2,295,331 | Brooks | Sept. 8, 1942 |

FOREIGN PATENTS

| | | |
|---|---|---|
| 241,577 | Great Britain | Oct. 16, 1925 |